United States Patent
Tempest

[11] Patent Number: 6,130,769
[45] Date of Patent: Oct. 10, 2000

[54] ROTARY MIRROR ASSEMBLY HAVING SPHERICAL HOUSING

[75] Inventor: Michael C. Tempest, Poole, United Kingdom

[73] Assignee: Westwind Air Bearings Limited, United Kingdom

[21] Appl. No.: 09/165,801

[22] Filed: Oct. 2, 1998

Related U.S. Application Data

[63] Continuation of application No. PCT/GB97/00946, Apr. 3, 1997.

[30] Foreign Application Priority Data

Apr. 3, 1996 [GB] United Kingdom ............... 9607053

[51] Int. Cl.[7] ............................................. G02B 26/08
[52] U.S. Cl. ........................................... 359/212; 359/209
[58] Field of Search .................................. 359/507, 508, 359/514, 212, 208, 214, 223, 226, 209, 210, 211, 367

[56] References Cited

U.S. PATENT DOCUMENTS

| | | | |
|---|---|---|---|
| 5,309,274 | 5/1994 | Akanabe | 359/210 |
| 5,420,714 | 5/1995 | Zelenka | 359/211 |
| 5,481,392 | 1/1996 | Damer | 359/210 |
| 5,526,168 | 6/1996 | Parl | 359/226 |
| 5,610,751 | 3/1997 | Sweeney et al. | 359/211 |
| 5,636,049 | 6/1997 | Kawata et al. | 359/211 |
| 5,815,302 | 9/1998 | McVey et al. | 359/214 |

FOREIGN PATENT DOCUMENTS

| | | |
|---|---|---|
| 0 096 089 | 12/1983 | European Pat. Off. . |
| 0 618 469 | 10/1994 | European Pat. Off. . |
| 2 691 589 | 11/1993 | France . |
| 41 30 977 | 3/1993 | Germany . |

*Primary Examiner*—Cassandra Spyrou
*Assistant Examiner*—Jared Treas
*Attorney, Agent, or Firm*—Nixon & Vanderhye PC

[57] ABSTRACT

A rotatable mirror assembly is described comprising a spherical housing (1) rotatable about an axis (A). The housing contains a mirror (2) bonded in the rear end of the housing. The housing at the front of mirror (2) has a flange (3) while a second enlarged flange (4) is formed at the rear of the mirror (2) the front of the mirror (2) has a sloping end face (5) at an angle of 45° of the rotary axis (A) which fives toward an opening (6) in the side of the housing (1). The opening (6) in a first embodiment is closed by an optically flat sapphire window (7) bonded into the opening (6) and in a second embodiment has a curved lens (17) mounted in the aperture. The improved assemblies reduce noise generation of high speed rotating mirrors and prevent the deposit of small particles of dust on the mirror surface.

9 Claims, 2 Drawing Sheets

ROTARY MIRROR ASSEMBLY HAVING SPHERICAL HOUSING

This is a continuation of PCT application No. PCT/GB97/00946, filed Apr. 3, 1997.

BACKGROUND OF THE INVENTION

1. Field of the Invention

This invention relates to a mirror assembly and more particularly to a mirror assembly in the field of image setting, which is rotatable at high speed.

2. Description of the Related Art

In the field of image setting the typical requirement is for the high speed rotation of a mirror in a housing which is normally formed to have a face nominally at 45° to the axis of rotation of the housing.

The disadvantage of such housings is the question of noise generated from the mirror which, hitherto required a significant level of sound proofing of the image setting machine in order to reduce the noise level to an acceptable level.

Another disadvantage of such housings is that a rotating mirror attracts very fine particles of dust which become deposited on the mirror during operation at high speeds of rotation. These particles of dust significantly degrade the performance of the rotating mirror.

SUMMARY OF THE INVENTION

An aim of the present invention is to overcome the above disadvantages and reduce to a minimum the noise generation of a high speed rotating mirror, as well as to prevent the deposition of small particles of dust on the mirror surface.

According to the present invention there is provided a rotatable mirror assembly, comprising a housing with a mirror mounted therein, and an aperture at the side of the housing, wherein the housing is spherical.

Conveniently, an optically flat window is mounted in the aperture.

Preferably, the housing has end flanges located at the front and rear of the mirror, and an axis, passing through the centres of flanges, about which the housing rotates Conveniently, alloy pins of a selected weight are located in the flanges to compensate for the inherent turning moment of the mirror.

In a preferred construction, the diameter of the mirror is 1.79 inches and the assembly is rotatable at 20,000 rpm.

Alternatively, the diameter of the mirror is 1.5 inches and the rotational speed of the assembly is 20,000 rpm.

In an alternative construction a curved lens is mounted in the aperture.

BRIEF DESCRIPTION OF THE DRAWINGS

Embodiments of a rotatable mirror assembly will now be described, by way of example only, with reference to the accompanying drawings, in which.

DETAILED DESCRIPTION OF THE INVENTION

Figure 1:
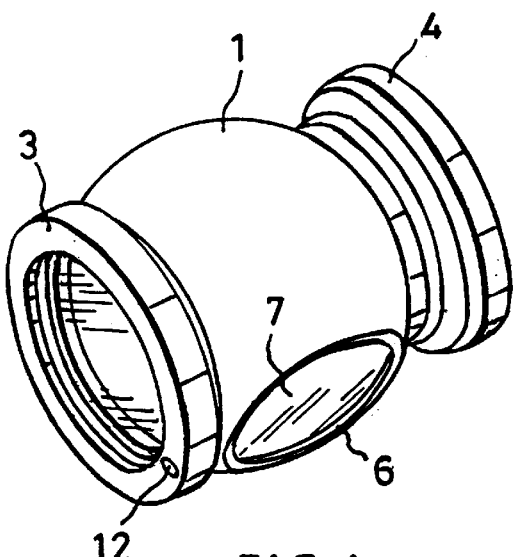
FIG. 1 is a perspective view of a rotatable mirror assembly, according to the present invention.
Figure 2:
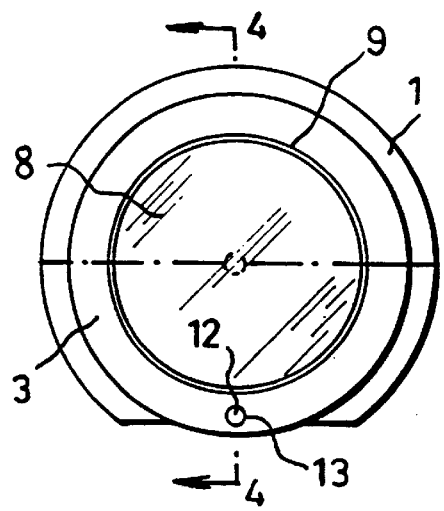
FIG. 2 is a front view of the assembly shown in FIG. 1.
Figure 3:
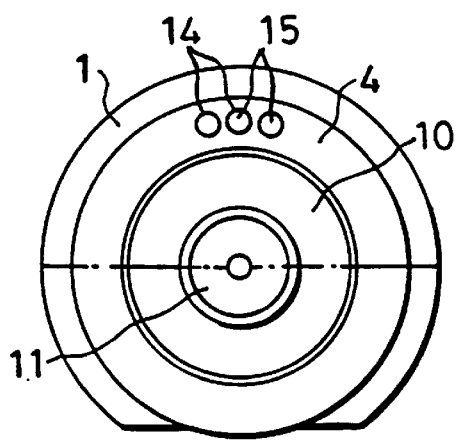
FIG. 3 is a rear view of the assembly shown in FIG. 1.
Figure 4:
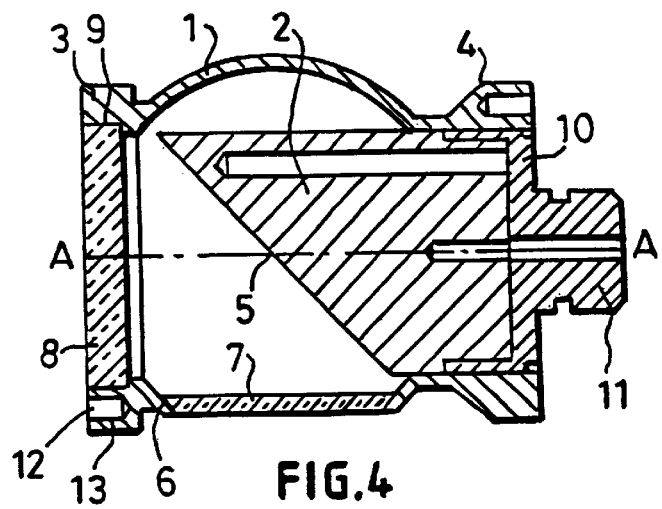
FIG. 4 is an axial cross-section taken along the line 4—4 of FIG. 2.
Figure 5:
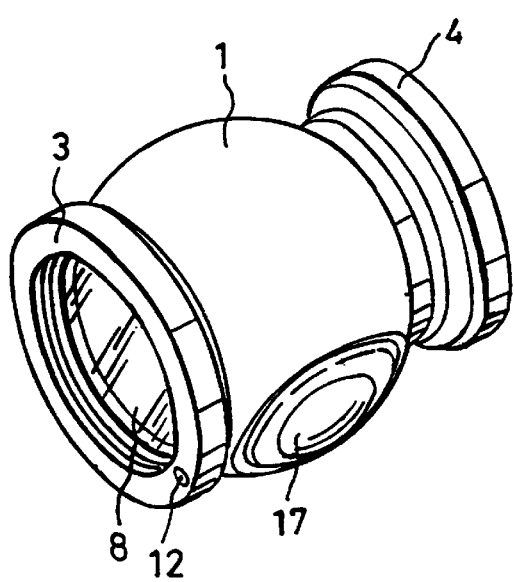
FIG. 5 is a perspective view of a rotatable mirror assembly, according to a second embodiment of the present invention.
Figure 6:
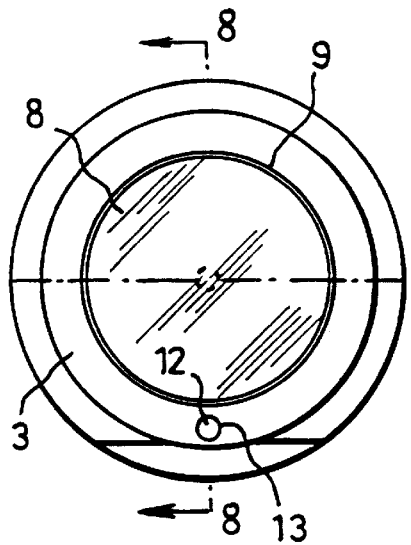
FIG. 6 is a front view of the assembly shown in FIG. 5.
Figure 7:
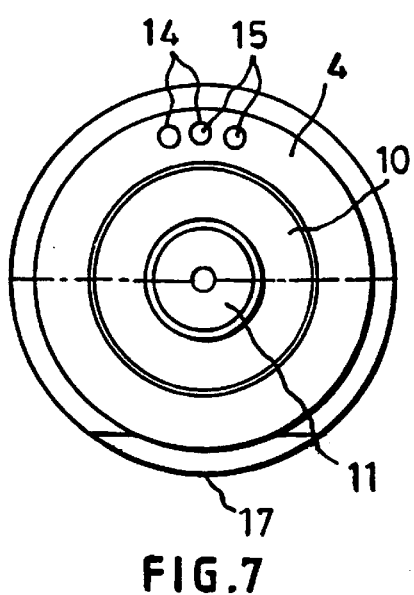
FIG. 7 is a rear view of the assembly shown in FIG. 5.
Figure 8:
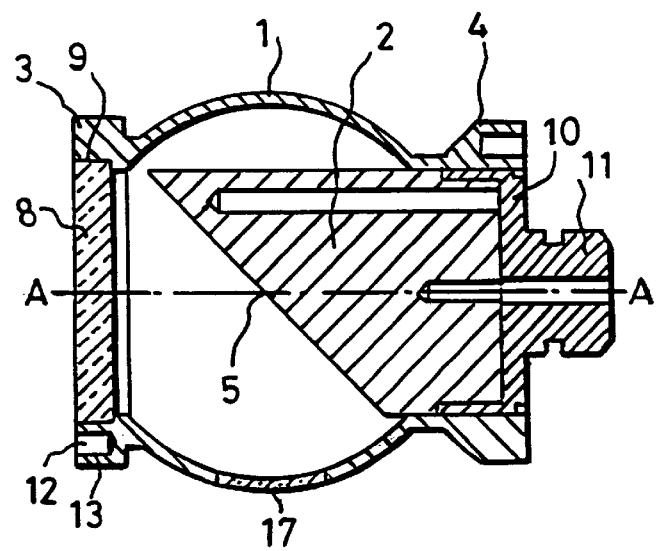
FIG. 8 is an axial cross-section taken along the 8—8 of FIG. 6.

The mirror assembly comprises a spherical shaped housing 1 rotatable about an axis "A", see FIG. 4. The housing contains a mirror 2 bonded by an adhesive e.g. ARALDITE 2003 (Registered Trade Mark) in the rear end of the housing. The end of the housing at the front of the mirror 2 has a flange 3, while a second enlarged flange 4 is formed at the rear of the mirror 2.

The front of the mirror 2 has a sloping end face 5 inclined at an angle of 45° to the rotary axis "A" which faces towards an opening 6 in the side of the spherical housing.

Due to the natural degree of distortion, due to the rotation of the window from an optical viewpoint, it is therefore essential to minimize this adverse effect. Of the available materials it has been found that sapphire is used as it has a high Youngs Modulus/density ratio. Accordingly the opening is closed by an optically flat sapphire window 7 bonded into the opening using an adhesive, e.g. ARALDITE 2003 (Registered Trade Mark). The front of the housing 1 is closed by a glass disc 8 bonded in a recess 9 form in the flange 3, A metal plate 10 with a central boss 11 is bonded into the inner wall of the housing flange 4.

The noise created on rotation of the mirror assembly at high speeds, i.e. 20,000 rpm is significantly reduced with the improved spherical housing 1 and optically flat window 7 according to the present invention.

To correct any rotational imbalance in the assembly, the front of the housing can be fitted with weighted alloy pins 12 located in a drilled hole 13 in flange 3 The selected pin 12 is bonded flush with the flange face using an adhesive, e.g. LOCTITE 601 (Registered Trade Mark). Similarly, the rear of the housing has three holes 14 drilled in the rear flange 4 which can be fitted with three selected heavy alloy pins 15 bonded in the holes 14 flush with the flange face using adhesive such as LOCTITE 601 (Registered Trade Mark). The pins 15 are selected to compensate for the inherent turning moment of the mirror.

Referring now to the second embodiment, like parts have the same reference numerals as in the first embodiment.

The front of the mirror 2 has a sloping end face 5 inclined at an angle of 45° to the rotary axis "A" which faces towards an opening 6 in the side of the spherical housing.

Rotation of the optical assembly inevitably causes some distortion of the outlet window. In order to minimize this adverse effect, sapphire is selected as the window material as it has a very high Youngs Modulus/Density ratio. Accordingly the opening is closed by a sapphire lens 17 bonded into the opening using an adhesive e.g. ARALDITE 2003 (Registered Trade Mark). The external curved surface of the lens at 17 conforms to a reasonable degree with the external curvature of the spherical housing at 1. This configuration has been shown to cut the noise generation of rotatable housings having a shape other than spherical. The flat lens has been shown not to have a seriously adverse effect on the optical performance of the system. The front of the housing 1 is closed by a glass disc 8 bonded in a recess 9 formed in the flange 3. A metal plate 10 with a central boss 11 is bonded into the inner wall of the housing flange 4.

The curved lens 17 retains a degree of balance which is not present when there is a large open port in the side of the housing. This lens construction minimizes the optical defect of the output window on the characteristics of the convergent laser beam. The lens construction creates a thin sapphire "fish eye" lens, where the outer radius of the lenses confirms nominally with the radius of the spherical housing. It is important that the sapphire lens should be of nominally constant thickness which implies an inner radius struck from the centre of the sphere. It will be appreciated that were the inner face of the lens to be flat then there would be a major influence on the characteristics of the laser beam.

Up to the present time considerable steps have been taken to provide a number of dynamic shrouds for high speed mirrors consisting of cylindrical housings mounted to enclose the mirror.

From a practical viewpoint the spherical housing combined with the flat side window retains a degree of balance which is not present when there is a large open port in the side of the housing. High speed rotating mirrors have been found to attract very fine particles of dust which become deposited on the mirror surface degrading the reflecting power and performance of the mirror. According to the invention, not only does the spherical shape of the housing significantly reduce the noise level caused by rotation of existng mirrors, but the enclosed mirror manifestly prevents the deposition of small particles on the mirror surface.

In practice it was found that the spherical housing using a flat outlet window proved most effective in reducing the noise generation In trials on a mirror of 1.79 inches diameter at 20,000 rpm noise level was reduced from −87 dB(A) to 74 dB(A). In the case of an unshrouded mirror of 1.5 inches diameter running at 20,000 rpm, the noise level was reduced from 78 dB(A) down to 69 dB(A).

What is claimed is:

1. A rotatable mirror assembly, comprising:
   a housing mounted for rotation about a longitudinal axis thereof and having a front end and a rear end, the housing including a spherical portion;
   a mirror fixedly mounted to the housing so as to rotate therewith, said mirror having an end face inclined to said longitudinal axis and disposed within said spherical portion of said housing;
   an aperture defined through a side wall of said spherical portion of the housing.

2. A rotatable mirror assembly as claimed in claim 1, wherein an optically flat window is mounted in the aperture.

3. A rotatable mirror assembly as claimed in claim 1, wherein a curved lens is mounted in the aperture.

4. A rotatable mirror assembly as claimed in claim 1, wherein the housing has end flanges located at each of said front end and said rear end of the mirror, a center of each said end flange being disposed on said longitudinal axis.

5. A rotatable mirror assembly, as claimed in claim 4, further comprising alloy pins of a predetermined weight disposed in preformed holes defined in said end flanges, thereby to compensate for a turning moment of the mirror.

6. A rotatable mirror assembly as claimed in claim 1, wherein the diameter of the mirror is 1.79 inches (45.5 mm) and the assembly is rotatable at 20,000 rpm.

7. A rotatable mirror assembly as claimed in claim 1, wherein of the mirror has a diameter of 1.5 inches (38.1 mm) and the assembly is disposed for selective rotation at 20,000 rpm.

8. A rotatable mirror assembly as claimed in claim 1, wherein said end face of said mirror is inclined at an angle of 45 degrees to said longitudinal axis.

9. A rotatable mirror assembly as claimed in claim 1, wherein said mirror is bonded to said housing at the rear end of the housing.

* * * * *